Patented Nov. 21, 1933

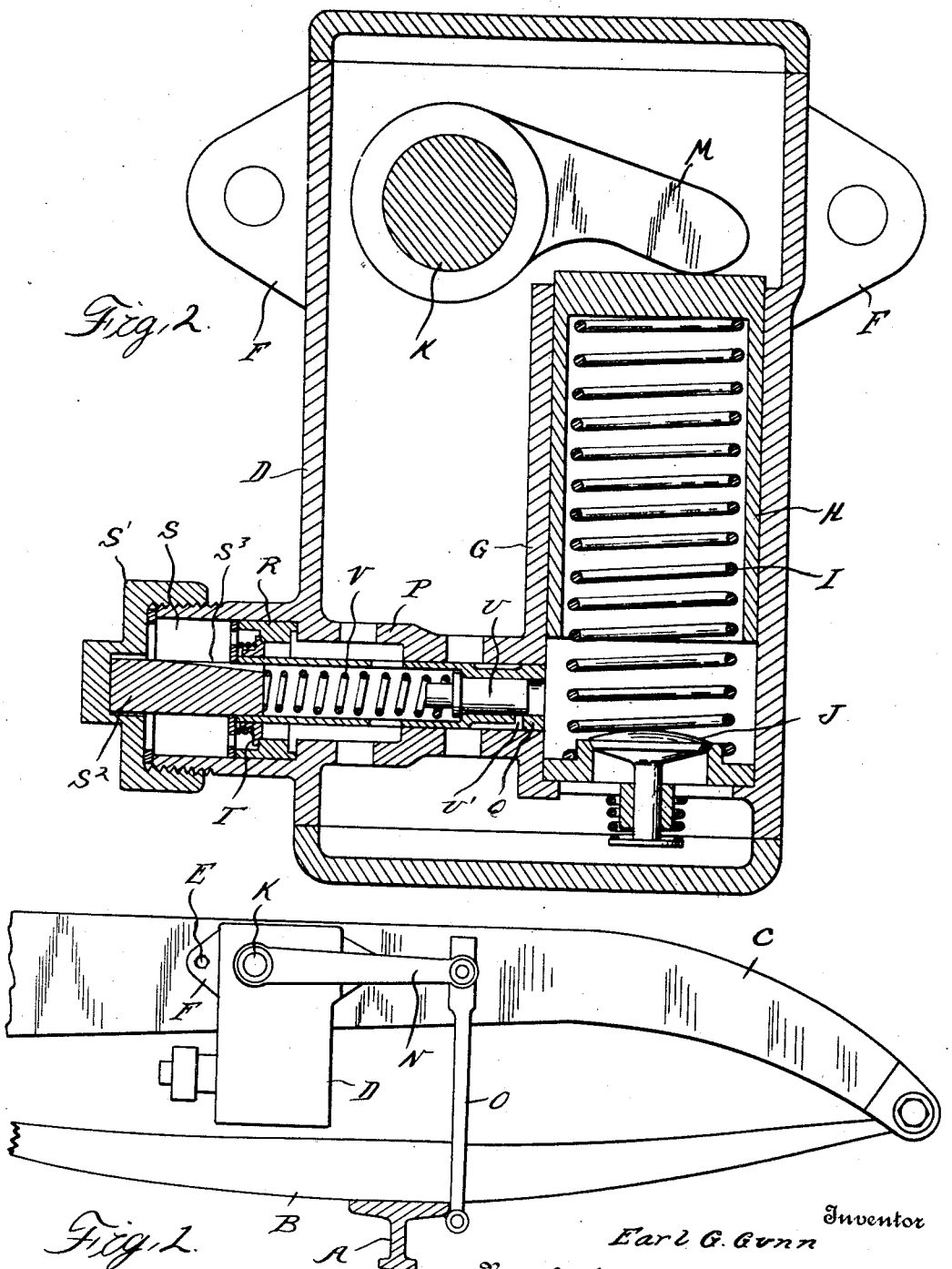

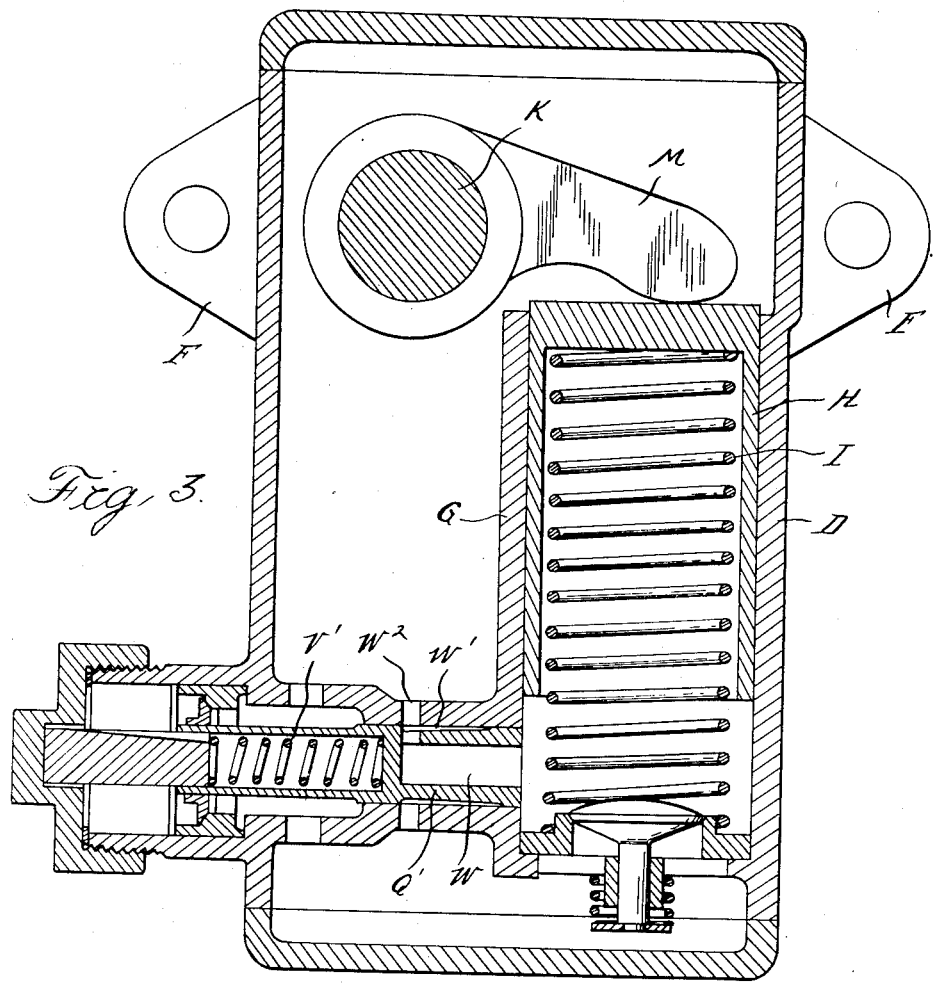

1,935,741

UNITED STATES PATENT OFFICE 1,935,741

SHOCK ABSORBER

Earl G. Gunn, Racine, Wis.

Application September 6, 1927. Serial No. 217,825

8 Claims. (Cl. 267—8)

The invention relates to shock absorbers particularly designed for use on spring supporting vehicle chassis. In the present state of the art various constructions of shock absorbers have been used which function to frictionally resist the relative movement of the sprung and unsprung parts usually upon the recoil of the spring after deflection. With some constructions the amount of resistance is proportional to the amplitude of movement and in some instances to the time or period of oscillation. It is, however, difficult with such devices to avoid interference with the free action of the spring at times and under conditions where the resistance is only detrimental. With my improved construction the resistance to each movement is relatively low at the start and is progressively increased during the time of the oscillation. Thus for rapid oscillations the resistance to free movement of the spring is negligible but for oscillations of longer period the resistance is built up in proportion to the length of time. By proportioning the rate of increased resistance to the inertial mass or sprung weight of the car, it is possible to check any objectionable oscillations in the car body while leaving the springs free to function when passing over slight obstacles.

In its broader features my invention is applicable to various types of construction but as specifically illustrated it is applied to a shock absorber of the hydraulic type and more specifically to one in which the resistant pressure reacts upon an oscillatory piston.

In the drawings:

Figure 1 is a side elevation of a portion of the vehicle axle, frame and spring suspension showing my improved shock absorber applied thereto.

Figure 2 is a central longitudinal section through the shock absorber.

Figure 3 is a similar view showing a slightly modified construction.

As shown A is the axle, B the spring and C the chassis frame supported on such spring. D is a housing which is preferably attached to the frame by suitable means such as the bolts E engaging ears F. This housing forms a container for the fluid and also has arranged therein the cylinder G and piston H. I is a spring operating upon the piston for moving the same outward and J is a check valve for freely admitting fluid from the container into the cylinder but preventing its passage outward. K is a rock shaft journaled in bearings in the upper portion of the housing and having a rock arm M bearing against the upper end of the piston externally. This shaft has secured thereto the actuating rock arm N which is connected by a pivotal link O to the axle. To variably resist the inward movement of the piston H the escape of fluid from the cylinder is regulated as follows: P is a cylindrical lateral extension of the cylinder G which contains a piston Q subjected to the unbalanced pressure of the fluid within the cylinder G. Movement of the piston Q in an outward direction is retarded by a dash pot comprising an enlarged piston head R operating in a cylinder S which forms a lateral extension of the housing D. The outer end of the cylinder S is closed by a cap S' and a central plug $S^2$ slidably engages a cylindrical recess in the piston Q. The plug $S^2$ has a restricted channel $S^3$ therein permitting the escape of fluid from the cylinder S during movement of the piston R therein. The escape is, however, so regulated as to produce the desired timing effect for retarding outward movement of the piston Q. A spring closed check valve T in the piston head R permits the quick return of fluid into the cylinder S upon movement of the piston Q in the reverse or inward direction. U is a valve within the piston Q for controlling a port U' for the escape of fluid from the cylinder G and V is a spring which bears against that valve and at its opposite end abuts against the plug $S^2$.

The construction just described is such that when the piston H is moved downward under the actuation of the rock arm M the fluid pressure in the cylinder will first force the valve U outward to open the port U'. This is accomplished with very slight increase in pressure on the fluid inasmuch as the spring B in the normal position of the valve is either under zero or very slight pressure. At the same time the pressure within the cylinder G will operate upon the piston Q and is sufficient to slowly move this piston outward, the velocity of such movement being regulated by the restriction of the passage $S^3$ through which the liquid in the cylinder S is displaced. The outward movement of the piston Q which carries the valve U with it will compress the spring V and build up the resistance thereof which in turn will react on the valve U and will build up pressure within the cylinder G. Thus for slow movements of the piston H, the pressure within the cylinder G is progressively built up offering a higher and higher resistance to the movement of the rock arm M and rock shaft K and thereby resisting relative movement of the frame C and axle A. On the other hand where the oscillation of the piston H is very rapid there will not be sufficient time to move the piston Q or build up the resistance of the spring V to any appreciable extent. Consequently the fluid in the cylinder G will be displaced through the port U' when building up resistance.

With the construction shown in Figure 3 the operation is the same with the exception that the valve U is dispensed with and the fluid from the cylinder G is displaced through a passage W in the piston Q and tapering metering passages W' which connect said passage W with escape ports W². The spring V' operates in this construction to variably resist the outward movement of the piston Q' so that the functioning of the device is the same as with the construction previously described.

In the complete operation of the shock absorber in case of a rapid oscillation of the spring B occasioned by the passing of the wheel over a short obstruction in the roadway the pressure of the fluid in the cylinder G is not sufficient to materially resist oscillation of the piston in such cylinder. This is desirable for with such rapid oscillations of the spring there is insufficient time to overcome the inertia of the sprung mass so that there is very little vertical displacement of the latter. If in place of such rapid oscillation the period of oscillation of the spring is increased in length then the reaction of this spring will tend to lift the frame and suspended load. However, before such effect can take place the piston Q will be moved outward sufficiently to build up the fluid pressure within the cylinder G which by retarding movement of the piston H will resist rapid displacement of the frame C.

While I have described a single acting shock absorber which controls only the recoil movement of the springs it is obvious that by using a pair of oppositely arranged shock absorbers both upward and downward movements of the spring may be correspondingly controlled. It is also obvious that means other than a piston and cylinder may be employed for building up the fluid pressure and for resisting movement of the rock arms.

What I claim as my invention is:

1. In a shock absorber the combination with a stationary member and an oscillatory member, of means independent of any movement of said stationary member for retarding return movement of said oscillatory member toward its normal position with initially slight resistance and for progressively increasing said resistance controlled by the length of the period of oscillation.

2. In a shock absorber the combination with a stationary member and an oscillatory member, of means independent of any movement of said stationary member for interposing only negligible resistance to the return movement of said oscillatory member toward its normal position when the period of oscillation is relatively short and for progressively increasing said resistance controlled by the length of the period.

3. In a shock absorber the combination with a stationary member and an oscillatory member, of means set in operation by the initial return movement of said oscillatory member toward its normal position for progressively increasing resistance to said return movement inversely to its velocity and directly to the amplitude of the oscillation.

4. In a shock absorber for spring suspension vehicles the combination with a stationary member and an oscillatory member actuated by a relative movement of the spring and body of the vehicle and of means set in operation by the initial return movement of said oscillatory member toward its normal position for resisting said return movement with progressively increasing resistance, said resistance being negligible where the period of oscillation is too short for the spring to materially displace the body.

5. In a shock absorber the combination with a stationary member and an oscillatory member, of means for progressively increasing the resistance to return movement of said oscillatory member timed to start with the initial return movement and controlled by the time and the amplitude of the oscillation.

6. A shock absorber comprising a relatively oscillatory piston and fluid containing cylinder, means permitting free entrance of fluid to said cylinder on the outward movement of the piston, means permitting escape of fluid from said cylinder with initially slight resistance and means for increasing the resistance to escape of fluid controlled by the length of time and the amplitude of movement of said piston.

7. A shock absorber comprising a relatively oscillatory piston and fluid containing cylinder, means for freely admitting fluid to said cylinder on the outward movement of the piston and for permitting escape of fluid with slight resistance on the initial return movement of said piston, means operated by the fluid pressure in said cylinder for progressively restricting the outlet for the fluid, and a dash pot for controlling the rate of increase of said resistance.

8. A shock absorber comprising a relatively oscillatory piston and fluid containing cylinder having inlet and outlet passages, a check valve controlling the inlet passage, a movable member for variably restricting the outlet passage normally in a position to interpose but slight resistance to the escape of fluid, means operating during the expelling movement of said piston for actuating said movable member to progressively increase the restriction to said outlet, and a dash pot for retarding the movement of said member whereby the restriction to said outlet is a function of the period of relative oscillation of said piston and cylinder.

EARL G. GUNN.